(No Model.)

G. F. SINGLETON.
SIGNAL LIGHT FOR CABS.

No. 422,256. Patented Feb. 25, 1890.

Witnesses:
A. G. Houghton
Jacob Houghton

Inventor:
Geo. F. Singleton
by Haupt Brothers
ATTORNEY.

UNITED STATES PATENT OFFICE.

GEORGE F. SINGLETON, OF CHICAGO, ILLINOIS.

SIGNAL-LIGHT FOR CABS.

SPECIFICATION forming part of Letters Patent No. 422,256, dated February 25, 1890.

Application filed December 27, 1887. Serial No. 259,159. (No model.)

*To all whom it may concern:*

Be it known that I, GEORGE F. SINGLETON, a citizen of the United States, residing in Chicago, in the county of Cook and State of Illinois, have invented a new and useful Signal-Light for Cabs, of which the following is a specification.

The object of my invention is to provide a means or device whereby the cab-man may be able to give notice to the public when his cab is for hire or in use, and I attain this object through the device shown in the accompanying drawings, in which—

Figure 1:
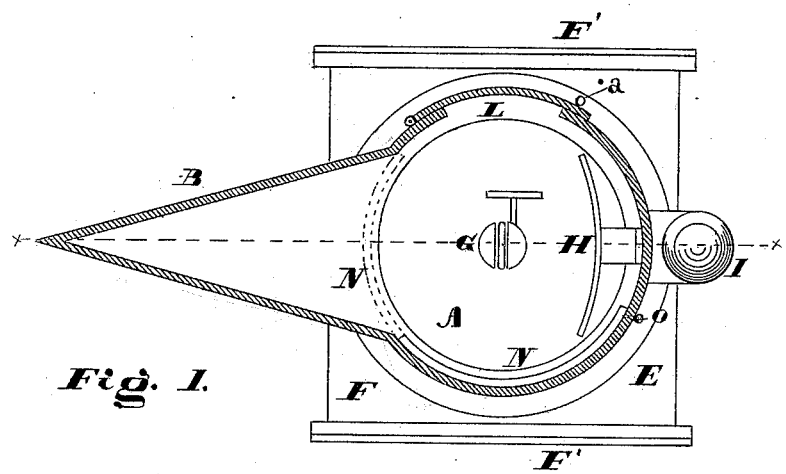
Figure 2:
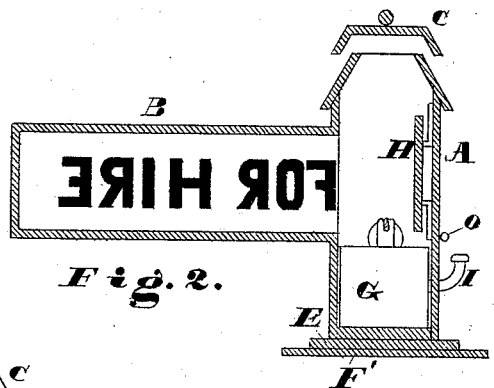
Figure 3:
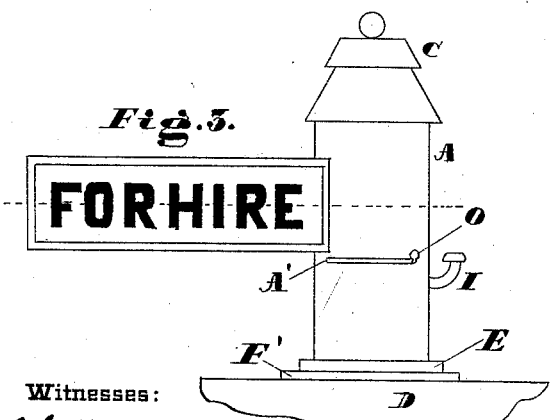

Figure 1 is a sectional view of the signal-light viewed from above and made on the middle line of the frame B. Fig. 2 is a vertical section of the signal-light. Fig. 3 is an elevation of the signal-light.

Similar letters refer to similar parts throughout the several views.

I make a lamp consisting of a jacket or body A, of suitable material, in a cylindrical form, having a hood or cap C on the top of the cylinder and a flange E at the bottom. The flange E is secured by proper means to the base-plate F. This base-plate F is secured to the top of a cab D by the cleats F' F', in which the base-plate slides. At a convenient point in the side of the jacket A, I make a horizontal slot A', in which slot A' slides the pin O, which is attached to a shutter N on the inner side of the jacket A. On top of the jacket A is a cap or hood C, and in the sides of the jacket A, at a proper point, is the funnel I to supply the lamp G with oil. On the side of the jacket A, at a point opposite the reflector H, I make an opening and prolong the side of the jacket A by a frame B, consisting of glass sides and a metal top and bottom, the sides being of glass, and upon the glass sides I paint the words "For Hire," so that when the lamp is lighted the words will appear on the glass. The glass sides are set at an angle, being widest apart at the body of the jacket A and converging to a point at the outer end. On the side of the jacket A, at a proper point, I make a hinged door L, secured when closed by the button $a$. Within the jacket A, at a point opposite the glass frame B, and secured to the side of the jacket A, is a reflector H, cylindrical in form, and so adjusted that the rays of light from the lamp G will fall upon the reflector H, and be projected into the glass frame B in such a manner that they will illuminate the surface.

Having thus described the parts of my invention, I now proceed to explain the manner of using the same: Having put the parts together, I slip the base-plate F in the cleats F', secured to the top or side of the cab P. I then light the lamp G. This illuminates the reflector H, and the rays of light are thrown on the sides of the frame B. In this way by illuminating the glass frame the cab-driver may indicate to the public that his cab is for hire, and the public is relieved of the necessity of stopping the cab to inquire if the cab is let or no. When the cab is not for hire at night, the shutter N is closed by pushing the knob which shuts off the light from the glass frame B.

I am aware that prior to my invention signal-lamps have been made, and I do not lay claim to the broad principle of signal-lamps.

What I claim, and desire to secure by Letters Patent, is—

In a signal lamp or lantern for cabs and other vehicles, the combination of the cylindrical jacket provided with the angular transparent frame at the side and a cap or cover at its top, having upon one side a hinged door and upon the other a horizontal slot, with the lamp, reflector, and sliding opaque shutter, all located inside the jacket, said shutter being provided with a knob or handle extending outwardly through said slot, whereby the shutter may be moved around between the frame and the lamp, all substantially as set forth.

GEO. F. SINGLETON.

In presence of—
ERNEST W. COOKE,
H. HAUPT, Jr.